United States Patent [19]
Gotisar

[11] 3,906,315
[45] Sept. 16, 1975

[54] CLOSED-LOOP, PRECISION-STOP INDUCTION MOTOR CONTROL CIRCUIT

[75] Inventor: Theodore H. Gotisar, El Dorado Hills, Calif.

[73] Assignee: Aerojet-General Corporation, El Monte, Calif.

[22] Filed: Jan. 15, 1974

[21] Appl. No.: 433,460

[52] U.S. Cl. .............................. 318/212; 318/369
[51] Int. Cl.[2] ........................................ H02P 3/20
[58] Field of Search .......... 318/203, 204, 209, 211, 318/212, 369

[56] References Cited
UNITED STATES PATENTS

| | | | |
|---|---|---|---|
| 2,767,363 | 10/1956 | Chubb | 318/369 |
| 3,546,550 | 12/1970 | Badal et al. | 318/212 |
| 3,700,990 | 10/1972 | Shuey et al. | 318/369 X |
| 3,761,790 | 9/1973 | Daab | 318/369 X |

Primary Examiner—G. Z. Rubinson
Attorney, Agent, or Firm—John S. Bell

[57] ABSTRACT

An induction motor deceleration control circuit capable of activating apparatus peripheral to the induction motor when the motor output shaft is at a predetermined speed and position, and then stopping the output shaft precisely at a predetermined position, all in a rapid one-step operation, is illustrated herein. The control circuit includes apparatus for providing an AC drive signal to the induction motor, a control for reducing the frequency of that AC drive signal in order to reduce the operating speed of the motor, a feedback loop for identifying the speed and position of the motor output shaft, and a brake control responsive to the feedback loop for converting the AC drive signal to a DC braking signal when the motor shaft slows to a predetermined speed and reaches a predetermined position. The controlled application of a braking signal in accordance with motor output shaft speed and position ensures that the shaft will only rotate through a known angle after application of the braking force and thus stop precisely at a predetermined distance. The control circuit also includes apparatus responsive to the feedback circuit for activating apparatus peripheral to the induction motor just before the induction motor is stopped, when the motor output shaft has a predetermined speed and position.

8 Claims, 1 Drawing Figure

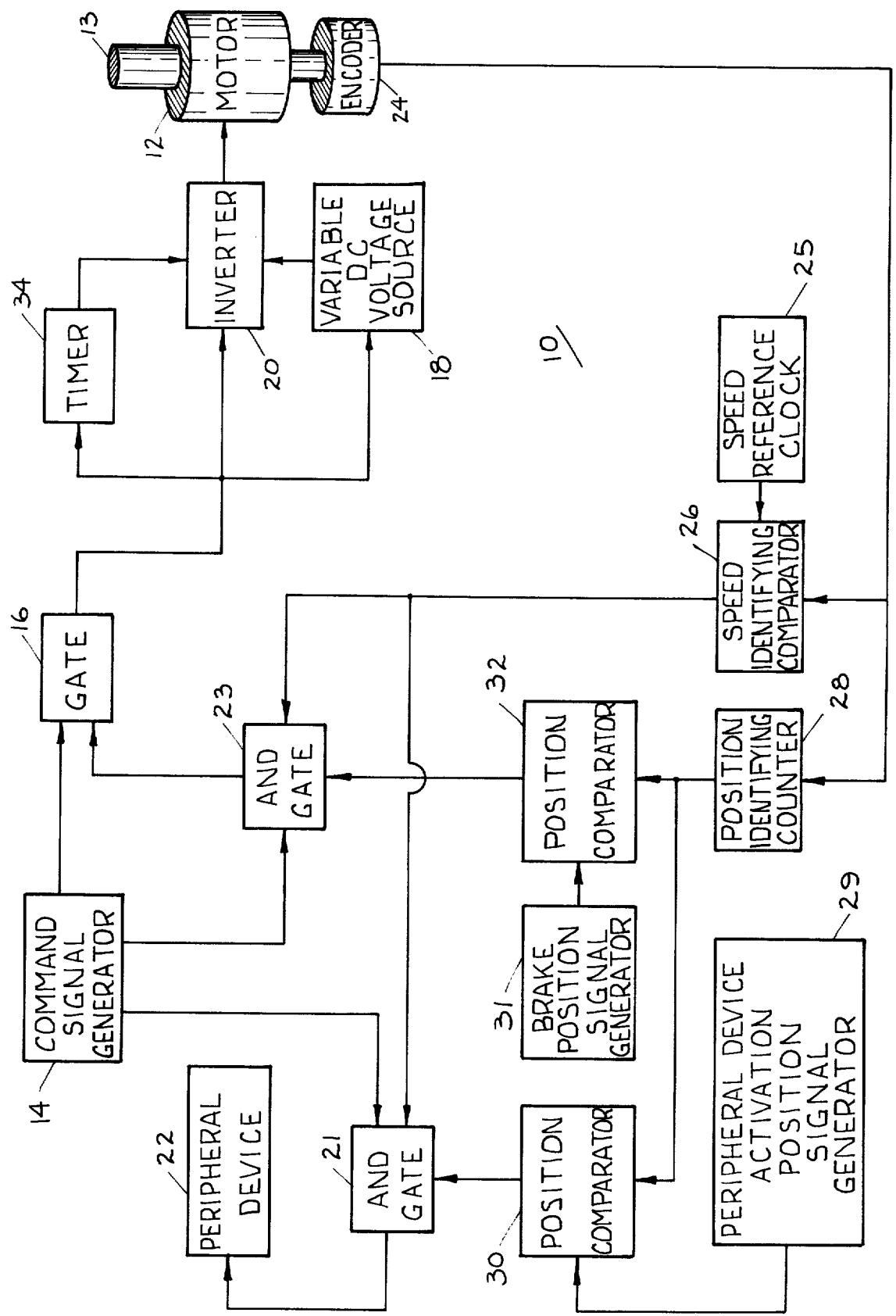

CLOSED-LOOP, PRECISION-STOP INDUCTION MOTOR CONTROL CIRCUIT

BACKGROUND OF THE INVENTION

1. Field of the Invention

Control circuits for electric induction motors.

2. Brief Description of the Prior Art

An induction motor typically comprises a cylincrical rotor disposed in a cylindrical stator housing. An output shaft is connected to the rotor to rotate with it. In operation, an AC electric current is supplied to the stator. This current induces an electric current in the rotor. Each current has an associated electric field. The stator field revolves about the rotor at a rate dependent upon the frequency of the AC electric signal supplied to the stator. Interaction between the stator and rotor fields causes the rotor and output shaft to rotate. The speed at which the rotor and output shaft rotate depends upon the frequency of the applied stator field. The rotor and output shaft are stopped by removing the AC signal supplied to the stator and applying a braking force. A braking force can be either applied mechanically to the motor output shaft, or electrically by supplying a DC signal to the stator. A DC signal supplied to the stator creates an electric field that opposes motion of the rotor.

Induction motors are extremely useful because they are simple, economical to construct, and provide a very high speed and power output. A typical induction motor has a power-to-weight ratio on the order of 0.15 horsepower per pound. One of the primary drawbacks of induction motors is the fact that they are difficult to control. For example, there is no practical control for rapidly stopping the output shaft of an induction motor precisely at a predetermined position. Accordingly, stepper motors and other non-induction motors are commonly used in machine tool and measuring systems in which a part must be driven precisely to predetermined position and then stopped. It would be advantageous if induction motors could be used in such systems because stepper and other non-induction motors are more complicated and do not provide the high power output of an induction motor. A typical stepper motor has a power-to-weight ratio on the order of only 0.08 horsepower per pound. And, stepper motors having more than about 1 horsepower are not currently available.

The use of induction motors is also limited by the lack of a practical motor control system that will also alter operation of a device peripheral to the device being driven by the induction motor as a precise function of the speed and position of the motor output shaft. It is necessary in many systems to activate a device peripheral to that being driven by the induction motor when the output shaft of that motor is located precisely at some predetermined position and when the shaft is moving at a speed that is slower than the high maximum speed that a typical induction motor is capable of providing. In systems requiring activation of peripheral apparatus at either a precisely predetermined motor shaft position, or at a motor speed less than the normal operating speed of the motor, or both, the present induction motor control circuits first arbitrarily stop the motor, operate it at a low predetermined speed while peripheral functions are being performed, and then either stop the output shaft at a desired position or accelerate the motor back to its normal operating speed. The repeated stopping of the induction motor to insure accuracy in performing peripheral functions is time-consuming, negates the high speed and power advantages of the induction motor, and can cause overheating of the motor in rapid response systems.

SUMMARY OF THE INVENTION

This invention comprises a practical, quick-response induction motor control circuit capable of very quickly stopping the output shaft of an induction motor precisely at a predetermined position. The circuit embodiment of this invention illustrated herein includes apparatus for controlling operation of a device peripheral to the induction motor. That circuit permits rapid motor deceleration, the activation of peripheral apparatus as a precise function of motor output shaft speed and position, and the stopping of the motor output shaft precisely in a desired position, to all be achieved in a quick, one-step operation. It is not necessary to either first stop the induction motor or operate it at a slow, predetermined speed for some interval before the operation of peripheral apparatus can be altered.

The induction motor control circuit of this invention stops the output shaft of an induction motor precisely in a desired position by first rapidly reducing the speed of that output shaft to a low value, measuring the speed and position of the output shaft during deceleration, and applying a braking force when the shaft slows to a predetermined speed and reaches a predetermined position. The slow, predetermined speed of the shaft upon application of the braking force causes it to travel only a small, precisely predeterminable distance after the braking force is applied. Since the shaft must reach a predetermined position as well as speed before the braking force is applied, that braking force brings the shaft to rest precisely at a desired position.

This invention also comprises a control system that can be effectively and reliably accomplished with simple circuitry. The control circuit embodiment of this invention illustrated herein includes apparatus for providing an AC drive signal to an induction motor. The frequency of this signal determines the speed of the motor output shaft. The output shaft is slowed by reducing the frequency of the drive signal. A frequency reduction is a reliable, easily accomplished control that very quickly decelerates the motor output shaft to a sufficiently slow speed so that it will travel only in very small and precisely predeterminable distance after application of the braking force. The braking force is applied to the slowed shaft by converting the AC drive signal to a DC braking signal. This conversion is accomplished with apparatus that is completely compatible with and also easily combined with the shaft decelerating speed control apparatus because the conversion of an AC signal to a DC signal is simply a reduction to zero of the frequency of the AC signal.

The precise control of peripheral apparatus is also easily achieved because the control of that apparatus utilizes the same motor shaft position and speed information that must be provided in order to appropriately time the application of the braking force. Any additional signals required for controlling peripheral apparatus, such as signals for activating or deactivating that apparatus at either a shaft speed or position that is different from the position at which the braking force is applied, are easily generated by a small amount of additional circuitry that is completely compatible with that for controlling application of the braking force.

BRIEF DESCRIPTION OF THE DRAWING

Further objects, features, and advantages of this invention, which is defined by the appended claims, will become apparent from a consideration of the following description of the accompanying FIGURE, which is a schematic, box-level, circuit diagram of one embodiment of the induction motor control circuit of this invention.

DETAILED DESCRIPTION OF THE DRAWING

The FIGURE illustrates a circuit 10 for controlling operation of an induction motor 12 having a rotatable output shaft 13. The rotation rate of output shaft 13 will be referred to herein as the operating speed of motor 12. The circuit 10 includes a command signal motor 14 which may be either preprogrammed or operator-controlled to provide command signals for controlling operation of the circuit 10 and motor 12. Command control 14 is constructed to provide a variable frequency motor speed control signal through a normally enabled gate 16 to a conventional induction motor drive unit comprising a DC voltage source 18 and inverter 20. Command signal generator 14 also provides an activation command signal to an "and" gate 21 whenever it is desired to activate a peripheral device 22, and a stop command signal to an "and" gate 23 when it is desired to stop operation of motor 12.

Voltage source 18 is a variable source that provides inverter 20 with a DC signal having a voltage level determined by the frequency of the speed control signal received from command signal generator 14. Inverter 20 is a switching network for converting the DC signal from source 18 to an AC motor drive signal by switching the direction that the signal from source 18 flows through the motor 12 at a rate determined by the frequency of the speed control signal from generator 14. "And" gates 21 and 23 are three input terminal "and" gates that require signals at all three input terminals before providing an output signal. Peripheral device 22 may be substantially any device. Its characteristics will vary in different system embodiments. But, to facilitate explanation of a number of advantages of this invention, consider the particular peripheral device 22 shown in the figure to be a device that must be activated when motor shaft 13 is rotating precisely at a speed that is slower than its normal operating speed, and precisely when the shaft reaches some predetermined angular position. A thread-cutting device in an automatically controlled sewing machine system in which the sewing needle is driven by motor 12 is one example of such a peripheral device. If the peripheral thread-cutting device is activated when shaft 13 is either rotating at too high a rate or is in the wrong position, the thread-cutting device will hit and break the sewing needle.

The circuit 10 also includes a feedback loop for identifying the speed of rotation and angular position of rotatable output shaft 13. This feedback loop comprises an encoder 24, a speed-reference clock 25, a speed-identifying comparator 26, a position-identifying counter 28, a peripheral device activation position signal generator 29, a position comparator 30, a brake position signal generator 31, and a position comparator 32. Encoder 24 is constructed to provide a pulse train having a repetition rate representing the rotation rate of motor shaft 13. Speed-reference clock 25 is constructed to provide a pulse train having a repetition rate representing a shaft rotation rate that has been predetermined to be the rate that the shaft should have when a braking force sufficient to stop the motor is applied to it. Comparator 26 is connected to receive the two pulse trains and provide an output signal to gates 21 and 23 whenever the repetition rate of the pulse train from encoder 24 is less than that of the pulse train from clock 25.

Position-identifying counter 28 identifies the angular position of shaft 13 by recording the number of pulses provided by encoder 24. Counter 28 resets to zero when the count reaches some predetermined value. In the control circuit 10, command signal generator 14 provides a stop command when it is desired to stop motor 12. It is thus contemplated that the feedback loop need control only the angular position within one complete rotation at which shaft 13 stops. Position control 28 therefore need record only the number of pulses from encoder 24 representing one complete shaft revolution, and can automatically reset to zero each time the count reaches this value. However, if desired, feedback loop can be modified to control the number of shaft rotations as well as the precise position of the shaft within one rotation when it is stopped simply by adjusting counter 28 to reset at some higher value.

Signal generators 29 and 31 are preprogrammed to provide count signals that represent the shaft positions at which it is desired to apply a command signal to peripheral device 23 and a braking signal to motor 12, respectively. Comparator 30 compares the count recorded by counter 28 with the preprogrammed signal from generator 29 and provides an output to "and" gate 21 whenever the two compared signals are equal. "And" gate 21 provides an output that activates peripheral device 22 whenever enabling signals are received at all three of the "and" gate input terminals. Comparator 32 compares the count recorded by counter 28 with the preprogrammed signal from generator 31 and provides an output to "and" gate 23 whenever those two compared signals are equal. When enabling signals are provided to all three of the input terminals or "and" gate 23, that gate provides an output signal that inhibits gate 16. As will be explained more fully hereinafter, inhibiting gate 16 causes voltage source 18 and inverter 20 to provide motor 12 with a DC signal that stops rotation of motor output shaft 13. This DC signal could possibly burn out motor 12 if it were not removed after shaft 13 is stopped. The circuit 10 therefore also includes a timer 34 for removing the DC signal after a predetermined interval.

In operation, command signal generator 14 provides a cyclic speed control signal having a frequency representing a desired motor operating speed. Voltage source 18 and inverter 20 receive this control signal and provide motor 12 with an AC drive signal that causes the shaft 13 to rotate at the desired speed. Assume motor 12 is running at a normal high operating speed and that it is desired to stop shaft 13 precisely at some desired angular position. Assume that it is also desired to activate peripheral device 22 when the shaft reaches some other angular position just before it is stopped. To accomplish this, command signal generator 14 reduces the frequency of the speed control signal supplied to voltage source 18 and inverter 20, and also provides signals to gates 21 and 23. The signals from generator 14 to gates 21 and 23 are applied continuously until the desired results are achieved. The signals provided to those gates do not have any immediate effect on operation of either motor 12 or peripheral device 22 though. Gates 21 and 23 will remain inhibited because they will not yet be receiving signals at their other two input terminals as is required for activation.

The frequency reduction of the control signal supplied to voltage source 18 and converter 20 from generator 14 instantaneously provides a corresponding frequency reduction in the drive signal provided to motor 12. This drive signal variation very rapidly reduces the operating speed of motor 12 to a value that permits activation of device 22, and application of a braking force to motor 12 that will cause shaft 13 to stop within a short, precisely predetermined interval after being applied. In addition to rapidly reducing the operating speed of motor 12, the low freuqency drive signal also insures that the motor 12 will not be stopped before shaft 13 reaches the desired stop position.

Speed-identifying comparator 26 provides an output signal to gates 21 and 23 when the operating speed of motor 12 falls below the speed represented by the signal from clock 25. Comparator 26 continues to provide this output signal until the motor is either stopped or accelerated back up beyond the speed represented by the signal from clock 25. When the count recorded by position-identifying counter 28 reaches a value indicating shaft 13 is at the angular position at which it is desired to activate peripheral device 22, comparator 30 provides an enabling output signal to gate 21. Comparator 30 provides this output signal only so long as the count in position counter 28 remains at the predetermined value. This prevents gate 21 from transmitting a signal that activates peripheral device 22 if motor shaft 13 reaches the position at which it is desired to activate device 22 and then moves away from that position before slowing to the desired speed.

The operation of comparator 32 differs from that of comparator 30 in that comparator 32 does not provide an enabling output to gate 23 until the signal from counter 28 indicates that motor shaft 13 has reached a second predetermined angular position slightly beyond that at which peripheral device 22 was activated. The difference in the shaft positions at which comparators 30 and 32 provide output signals can be as low as a small fraction of one shaft revolution. Like comparator 30, comparator 32 also provides an output signal only so long as the two compared signals are equal. For comparator 32, this equality indicates that shaft 13 is in the position at which it is desired to apply a braking force to motor 12.

When gate 23 receives enabling signals at all three of its input terminals, that gate provides an output signal that inhibits gate 16 and thus blocks the cyclic speed control signal that is normally transmitted from command signal generator 14 to voltage source 18 and inverter 20. This blocking of the speed control signal causes inverter 20 to stop changing the flow direction of the drive signal through motor 20, and thus converts the AC drive signal to a DC voltage that opposes motion of shaft 13. Since this DC voltage is applied when the shaft is rotating at a predetermined speed and thus has a predetermined inertia, and when the shaft is also precisely at a predetermined position, the shaft will only continue to rotate through a small, precisely predeterminable angle after application of the braking force and come to rest precisely at a preselected position. If desired, the operating parameters of the various elements of circuit 10 can be set so that shaft 13 rotates only a small fraction of a cycle after application of the braking signal. This provides an extremely precise control that is not susceptible to variation by external forces.

Timer 34 removes the DC braking signal from motor 12 after shaft 13 is stopped in order to prevent that DC signal from burning out or otherwise damaging the motor. Timer 34 is activated by the blocking of the speed control signal from generator 14. At an appropriate predetermined time after activation, timer 34 provides an output signal that inhibits at least one of the switches in the switching network that comprises inverter 20 and thereby blocks transmission of the DC signal to motor 12.

Having thus described the construction, operation, and advantages of one embodiment of this invention, a number of modifications will now be readily apparent to those skilled in the art. Equivalent structures for performing the functions performed by the various portions of the circuit 10 are known. In addition, embodiments of this invention will be incorporated into different systems for performing different functions, and those embodiments will require modification in accordance with the control signal requirements of the incorporating systems.

Therefore, what is claimed is:

1. A precision-stop control circuit for controlling an electric induction motor having a movable output member, said circuit comprising:

means for providing a cyclic drive signal to the induction motor, the frequency of said drive signal at least partially determining the rate of motion of said motor output member;

means for initiating braking by reducing the frequency of said drive signal to thereby reduce the operating speed of the induction motor to a predetermined non-zero value;

feedback control means for identifying the speed and position of the movable motor output member; and means responsive to the feedback control means for stopping the induction motor by converting said cyclic drive signal to a DC signal when the movable member slows to a predetermined speed and reaches a predetermined position, the predetermined speed and position of said movable output member upon application of the DC signal causing said member to move a predetermined distance after application of said DC signal and stop precisely at a predetermined position.

2. The control circuit of claim 1 in which:

the circuit further includes timing means responsive to the initial application of said DC signal to the induction motor for removing said DC signal from said induction motor after a predetermined interval to prevent said DC signal from damaging said motor after stopping said movable output member.

3. The control circuit of claim 2 in which:

said brake initiating means comprise means for providing a variable frequency control signal;

said drive signal providing means comprise voltage source means responsive to said control signal for providing a DC electric signal having a voltage level determined by the frequency of said control signal; and switching means coupling said voltage source means to the induction motor for switching the direction that the signal from said voltage source flows through said induction motor to thereby convert said DC signal to an AC induction motor drive signal, said switching means being responsive to said control signal and switching the direction of flow through the induction motor at a rate determined by the frequency of said control signal; and said means for converting said cyclic drive signal to a DC signal comprise gating means responsive to said feedback control means for blocking said control signal from said switching means to thereby fix the direction of flow of said drive signal through said induction motor.

4. The control circuit of claim 1 in which said feedback control means comprise:

means for providing a cyclic motor speed signal having a frequency representing the rate of motion of said movable motor output member;

signal generator means for providing a reference signal having a frequency representing a predetermined rate of motion;

speed-identifying means for comparing the frequencies of said motor speed and reference signal and providing an enabling output signal when the frequency of said motor speed signal is less than that of said reference signal; and position-identifying means for counting the cycles of said feedback signal and providing an enabling output signal when the count equals a predetermined value; and said means for converting said cyclic drive signal to a DC signal is connected to said speed-identifying means and said position-identifying means and requires receipt of said enabling signals from both said speed-identifying means and said position-identifying means to provide said DC signal to the induction motor.

5. The control circuit of claim 4 in which:

the circuit includes means for providing a brake command signal to said signal converting means; and said signal converting means include gating means requiring receipt of said brake command signal as well as said enabling signals to convert said cyclic drive signal to a DC signal.

6. The control circuit of claim 1 further including peripheral control means responsive to said feedback control means for providing a predetermined command signal to apparatus peripheral to the induction motor when the movable motor output member slows to a predetermined speed and reaches a predetermined position.

7. The control circuit of claim 6 in which:

said peripheral control means comprise means for providing said predetermined command signal when the movable motor output member is at a position displaced from the position at which said signal converting means converts said cyclic drive signal to a DC signal, to thereby permit reduction of the operating speed of the induction motor, alteration of the operation of peripheral apparatus when said movable motor output member is in a predetermined position, and precise stopping of said movable motor output member, to all be achieved in a rapid sequence.

8. The control circuit of claim 6 in which:

said feedback control means comprise: means for providing a first output signal to both said signal converting means and said peripheral control means when the movable motor output member slows to a predetermined speed; means for providing a second output signal to said peripheral control means when the movable motor output member is in a first predetermined position; and means for providing a third output signal to said signal converting means when said movable motor output member is in a second predetermined position;

said peripheral control means comprise means for providing said predetermined command signal upon receipt of said first and second signals from said feedback control means; and said signal converting means comprise means for converting said cyclic drive signal to a DC signal upon receipt of said first and third signals from said feedback control means; said brake initiating means, said feedback control means, said means for activating peripheral apparatus, and said signal converting means thereby together permitting a reduction in the operating speed of the induction motor, the alteration of operation of peripheral apparatus when the movable motor output is in a predetermined position, and the precise stopping of said movable output member, to all be achieved in a rapid sequence.

* * * * *